United States Patent Office 3,243,282
Patented Mar. 29, 1966

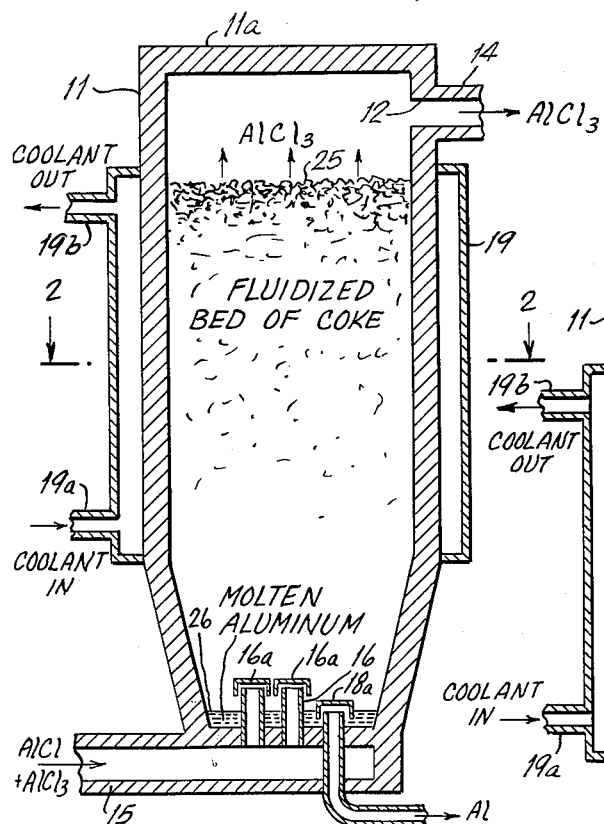
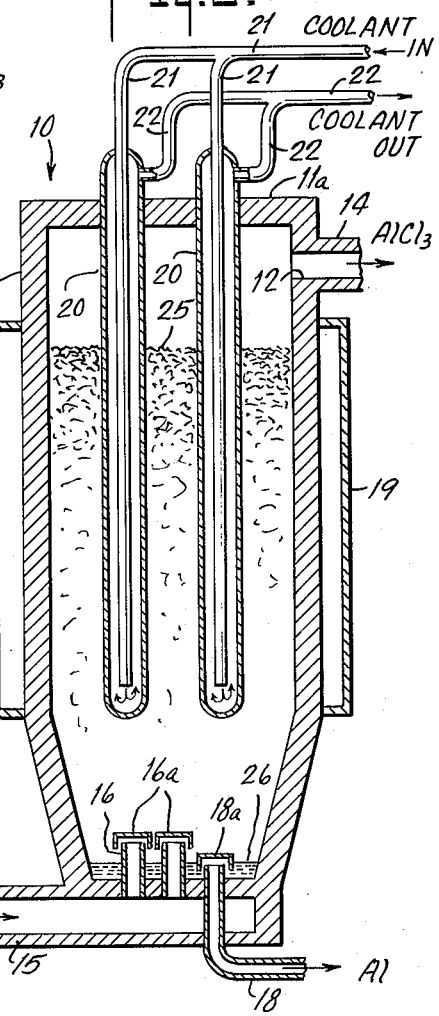
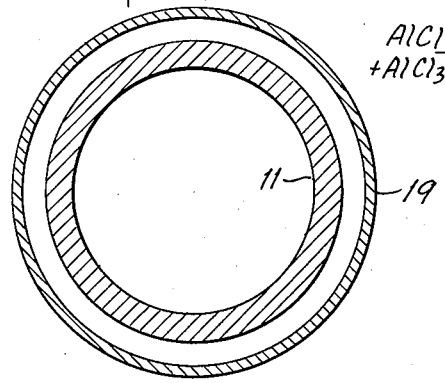

3,243,282
RECOVERY OF ALUMINUM FROM GASEOUS
ALUMINUM MONOHALIDE
James Peter McGeer, Arvida, Quebec, Canada, assignor to Aluminium Laboratories Limited, Montreal, Quebec, Canada, a corporation of Canada
Filed Apr. 24, 1963, Ser. No. 275,366
3 Claims. (Cl. 75—68)

This invention relates to the production and recovery of aluminum by the so-called subhalide process. In the subhalide or catalytic distillation process for the production of elemental aluminum, an aluminum alloy or an impure aluminum-containing material is treated at an elevated temperature to yield a gaseous subhalide or monohalide of aluminum. The gaseous aluminum monohalide is recovered and passed to a condensing or decomposition zone wherein a reverse chemical reaction occurs involving dissociation of the gaseous aluminum monohalide to yield relatively pure elemental aluminum together with the corresponding normal aluminum halide, the corresponding aluminum trihalide.

In a proposed method of carrying out the subhalide distillation process, the aluminum-containing material is treated in a suitable converter where it is heated and wherein a gaseous aluminum trihalide, such as aluminum trichloride or aluminum tribromide, is brought into contact with the aluminum-containing material at a suitable elevated temperature, such as a temperature above about 1000° C., e.g. a temperature in the range of 1100° C.–1300° C. and at a suitable pressure, which may be atmospheric, superatmospheric or subatmospheric. The gaseous aluminum trihalide reacts with the aluminum in the aluminum-containing material to produce in gaseous form the corresponding aluminum monohalide, such as aluminum monochloride or aluminum monobromide. Thus, where the aluminum trihalide is aluminum trichloride, the gas recovered from the converting zone or converter contains a substantial amount of aluminum monochloride together with unreacted or the excess aluminum trichloride.

The gas recovered from the converter is then passed to a decomposing zone where a suitable temperature is maintained so that the reverse reaction occurs, with the aluminum monohalide reverting to aluminum and the corresponding aluminum trihalide. Accordingly, in the decomposing zone gaseous aluminum monochloride reverts to elemental aluminum and gaseous aluminum trichloride. The aluminum is condensed, collected and recovered as product and the gaseous aluminum trihalide is recovered from the decomposing zone for reuse in the process. By these operations relatively pure elemental aluminum is recoverable from impure aluminum-containing material.

In the decomposing zone wherein the aluminum monohalide reverts to elemental aluminum and the corresponding aluminum trihalide, a considerable quantity of heat must be removed. Also, it is desirable to provide therein a large contact area for the collection of the elemental aluminum preferably in molten form.

Various techniques and apparatus have been proposed to effect the decomposition of a gaseous aluminum monohalide, such as aluminum monochloride, to molten elemental aluminum and the corresponding gaseous aluminum trihalide, such as aluminum trichloride. For example, it has been proposed to carry out the decomposition reaction in a packed tower. Although a packed tower provides a large collection area for the molten elemental aluminum, the heat transfer and dissipation of heat from a packed tower is not satisfactory. It has also been suggested to employ a decomposing zone provided with a pool of molten elemental aluminum which is maintained agitated. Although a pool of molten elemental aluminum provides excellent heat transfer characteristics, the heat transfer area and contact area available is relatively small.

Accordingly, it is an object of this invention to provide an improved subhalide or catalytic distillation process for the production of elemental aluminum.

It is another object of this invention to provide an improved process and apparatus for effecting the decomposition of a gaseous aluminum monohalide, such as aluminum monochloride, into molten elemental aluminum and the corresponding gaseous aluminum trihalide, such as aluminum trichloride.

Still another object of this invention is to provide an improved method and apparatus for maintaining the temperature at which a gaseous stream containing aluminum monohalide is treated to effect decomposition of the aluminum monohalide therein into molten elemental aluminum and the corresponding gaseous aluminum trihalide.

How these and other objects of this invention are accomplished will become apparent in the light of the accompanying disclosure made with reference to the accompanying drawings wherein:

FIG. 1 is a somewhat schematic view showing in vertical section a decomposer or decomposing zone in accordance with this invention;

FIG. 2 is a sectional plan view taken along line 2—2 of FIG. 1; and wherein

FIG. 3 is a somewhat schematic view in vertical section of another decomposer or decomposing zone in accordance with this invention.

It has now been discovered that a fluid bed decomposer or decomposing zone is particularly useful for effecting decomposition of a gaseous monohalide, such as gaseous monochloride, into elemental aluminum and the corresponding gaseous aluminum trihalide, such as aluminum trichloride. More particularly, in accordance with this invention it has been found that a fluid bed type decomposer or decomposing zone is useful for effecting temperature control of the decomposition reaction involved in cooling hot gaseous aluminum monohalide, such as aluminum monochloride, to produce molten elemental aluminum and the corresponding gaseous aluminum trihalide, aluminum trichloride.

In a fluid bed decomposer or decomposing zone large surface area is available for heat transfer and heat dissipation and for condensation of the elemental aluminum. Further, fluid or fluidized beds provide high rates of heat transfer. In the operation of a fluid bed decomposer or decomposing zone in accordance with this invention a mass of particle-form material is maintained fluidized within the decomposer. The fluid bed of inert particle-form material within the decomposer is maintained at a desired relatively low temperature, such as a temperature below about 1000° C. but above the melting point of aluminum, such as a temperature in the range 700–900° C. The gas necessary to maintain the bed of particle-form material fluidized within the decomposer is provided by the gaseous aluminum monohalide itself, usually in equilibrium admixture with gaseous aluminum trihalide, introduced into the lower portion of the decomposer.

As the gaseous aluminum monohalide flows upwardly through the decomposer it fluidizes the mass of particle-form material therein and is cooled by contact with the particle-form material. As the gaseous aluminum monohalide is cooled within the decomposer it decomposes to form molten elemental aluminum and the corresponding gaseous aluminum trihalide. The gaseous aluminum trihalide also serves to fluidize the particle-form contact material. The gaseous aluminum trihalide is recovered from the upper portion of the decomposer for reuse in the process. The condensed molten elemental aluminum is separately recovered from the lower portion of the decomposer and withdrawn as product. The desired operating temperature within the decomposer is provided by means of a heat exchange jacket surrounding at least a portion of the decomposer. A suitable cooling fluid is circulated through the heat exchange jacket to provide the desired operating temperature within the decomposer.

Instead of a heat exchange jacket surrounding the decomposer a heat exchanger may be provided within the decomposer at least partially immersed within the fluidized mass of particle-form material therein. Also, if desired, both the heat exchange jacket surrounding the decomposer and the heat exchanger, such as a heat exchanger of the thimble-type or the U-tube type, may be provided in association with the decomposer.

Any inert, finely-divided, particle-form, contact material capable of being fluidized may be employed in the practice of this invention. Desirably, the particle-form material has a density less than that of the molten aluminum under the contacting conditions maintained within the decomposer. Also, desirably, the particle-form contact material is such that it is not wetted or is non-wettable by the molten aluminum. Suitable particle-form contact material useful in the practice of this invention include such materials as coke, particularly petroleum coke, low ash coal coke, graphite and low density alumina, such as small hollow alumina spheres known as "bubble" alumina. By employing particle-form contact material which is not wetted by the molten aluminum and which is less dense than the molten aluminum under the conditions of contacting, in the event the fluidizing gas flow to the decomposer is interrupted the particle-form contact material will settle to the bottom of the decomposer and float on top of the layer or pool of molten aluminum therein. Upon resumption of gas flow through the decomposer the particle-form contact material could then be readily refluidized.

Referring now in detail to the drawings, which are illustrative of the apparatus and the practice of this invention and wherein the same reference numerals are employed to identify equivalent elements, the decomposer or decomposing zone, generally indicated by the reference numeral 10, comprises an elongated, vertically disposed, closed, cylindrical vessel 11. An outlet 12 is provided in the upper end of vessel 11 for the discharge of effluent gases via conduit 14. An inlet conduit 15 is provided in fluid communication with the lower end of vessel 11 via gas distributing conduits 16. Gas distributing conduits 16 are provided with distributing caps 16a at the upper end thereof to provide for uniform distribution of the fluidizing gas within vessel 11 and also to prevent the particle-form material within vessel 11 from entering and plugging conduits 16 and inlet 15.

Discharge conduit 18 is also provided in fluid communication with the lower end of vessel 11 for the withdrawal of molten aluminum. Discharge conduit 18 is provided with cap 18a at the end thereof within vessel 11 so as to provide a seal of molten aluminum with respect to conduit 18 to prevent the particle-form contact material withdrawn via conduit 18. Heat exchange jacket 19 surrounds vessel 11. Jacket 19 is provided with an inlet 19a and an outlet 19b for the circulation of coolant fluid through jacket 19.

Any suitable coolant fluid effective to maintain the desired operating temperature within vessel 11 may be employed. Suitable coolant fluids include molten aluminum or molten mixtures of sodium chloride and aluminum trichloride. Examples of molten salt mixtures suitable as coolant fluids are set forth in U.S. 2,914,398. The disclosures of this patent are herein incorporated and made part of this disclosure.

Referring now in particular to FIG. 3, there is illustrated a further embodiment of the practice of this invention wherein additional heat exchange surface or heat exchange means is provided in association with vessel 11. As illustrated in FIG. 3 vessel 11 is provided with one or more thimble or finger-type heat exchangers 20 which depend from the top 11a of vessel 11 into the interior thereof and adapted for immersion into the mass of fluidized particle-form contact material maintained in vessel 11. Finger-type heat exchangers 20 are provided with coolant inlet conduits 21 and coolant discharge conduits 22.

In operation a mass of finely-divided inert particle-form material, such as petroleum coke having a particle size in the range 48 x 100 mesh, i.e. having a particle size such that substantially all of the particle-form coke passes through a 48 mesh screen but is retained on a 100 mesh screen, is provided within vessel 11. A hot gaseous equilibrium mixture comprising aluminum monochloride and aluminum trichloride at a temperature substantially above 1000° C., such as a temperature of about 1250° C., is introduced via inlet 15 and distributing conduits 16 into the bottom of vessel 11. As the hot gaseous mixture flows into and through vessel 11 the mass of particle-form coke therein is fluidized, the top level of the fluidized bed of coke being indicated by reference numeral 25.

As the hot gaseous mixture moves through the fluidized bed of coke particles it is cooled by contact therewith, the coke particles being maintained at a desired temperature, below about 1000° C., such as about 700° C., by the circulation of suitable coolant fluid such as a molten $NaCl$–$AlCl_3$, salt mixture through jacket 19. As the gaseous aluminum monochloride passes through the fluid bed of coke particles it is cooled to about 700° C., and upon cooling decomposes to molten elemental aluminum and gaseous aluminum trichloride. The thus-formed gaseous aluminum trichloride, together with the gaseous aluminum trichloride introduced into vessel 11 in admixture with the gaseous aluminum monochloride, is recovered from vessel 11 via outlet 12 and conduit 14.

The molten elemental aluminum produced within vessel 11 descends therein and forms a pool at the bottom. The top level of the pool of molten aluminum in the bottom of vessel 11 is indicated by reference numeral 26. The molten elemental aluminum is withdrawn as product from the bottom of vessel 11 via discharge conduit 18.

From the foregoing it is apparent that when the gas flow of aluminum monochloride and aluminum trichloride introduced into the bottom of vessel 11 to fluidize the particle-form coke particles therein is interrupted the fluidized bed of coke particles collapses and the coke particles settle within vessel 11 and float on the pool of molten aluminum therein. Upon resumption of the flow of gaseous aluminum monochloride into vessel 11 the settled mass of particle-form coke particles is refluidized.

The following examples are illustrative of the practices of this invention:

*Example No. 1*

An equilibrium mixture of the gaseous aluminum monochloride and gaseous aluminum trichloride (63% by volume aluminum monochloride) at a temperature of about 1250° C. is introduced into a decomposer of the type illustrated in FIG. 1 to fluidize a mass of coke particles therein. The fluidized mass of coke particles is maintained at a temperature of about 700° C. by circulating coolant fluid, a mixture of NaCl and $AlCl_3$ salts, through a heat exchange jacket surrounding the decomposer. Desirably, the particle-form petroleum coke having a particle size in the range 48 x 100 mesh is employed as a fluidized contact material. Under these conditions the diameter of the decomposer is about 3 feet and the flow rate of effluent gaseous aluminum trichloride from the decomposer is about 800 lbs. per hour. In the above-described operation about 200 pounds of molten aluminum metal is produced and withdrawn each hour and about $4.7 \times 10^5$ B.t.u. are transferred from the particle-form coke material to the NaCl–AlCl₃ salt mixture coolant fluid circulating through the heat exchange jacket surrounding the decomposer. The fluidized bed of coke in the aforesaid operation has a depth of about 12 feet and the aforesaid described decomposer operates satisfactory over a range of from about 200 to 1000 pounds of gaseous aluminum trichloride effluent flow per hour and at a molten elemental aluminum production rate of from about 20 to 250 pounds per hour.

*Example No. 2*

This example relates to the operations and apparatus described in connection with Example No. 1, save heat exchanger tubes are additionally provided within the decomposer positioned to be immersed in contact with the fluidized bed of coke particles therein. With 9 U-tube type heat exchangers made up of 1.5 inch diameter pipe inserted into the fluidized bed of coke particles to a depth of 4 feet, the additional exchange surface thus provided permits a decrease in the total fluidized depth bed of from 12 feet to 6 feet.

*Example No. 3*

This example relates to the apparatus and process described in connection with Example No. 1. The cooling and decomposition of the hot gaseous aluminum monochloride however is carried out in two stages. In the first stage, the fluidized bed of coke particles is maintained at a temperature of about 900° C. so as to effect removal of about 80% of the total heat required to be removed in the overall process. Actual decomposition is then completed in the second stage operation or in the second fluidized bed operated at about 700° C. For the flow rates employed in connection with Example No. 1, a bed height of about 3 feet is required for the first stage and a bed height of about 3.5 feet is required for the second stage.

As will be apparent to those skilled in the art in the light of the foregoing disclosure many modifications, alterations, changes and substitutions are possible in the practice of this invention without departing from the spirit or scope thereof.

What is claimed is:

1. A method of producing molten elemental aluminum which comprises contacting an aluminum alloy with a gaseous aluminum trihalide at an elevated temperature above about 1000° C. to effect reaction between the aluminum in said alloy and the gaseous aluminum trihalide to form a gaseous aluminum monohalide, withdrawing the resulting produced gaseous aluminum monohalide and introducing said gaseous aluminum monohalide into a decomposing zone, maintaining within said decomposing zone a fluidized mass of inert particle-form material at a temperature below about 1000° C. effective to cool the gaseous aluminum monohalide introduced into said decomposing zone to a temperature to effect decomposition of said gaseous aluminum monohalide into a gaseous aluminum trihalide and molten elemental aluminum, said mass of inert particle-form material being fluidized by flowing therethrough the gaseous aluminum monohalide introduced into said decomposing zone, and withdrawing the resulting produced molten elemental aluminum from said decomposing zone as product.

2. A method in accordance with claim 1 wherein said gaseous aluminum monohalide is gaseous aluminum monochloride, wherein said gaseous aluminum trihalide is gaseous aluminum trichloride, wherein said inert particle-form material is particle-form coke and wherein said particle-form material is maintained in said decomposing zone at a temperature in the range from above the melting point of aluminum to about 1000° C.

3. In an operation wherein hot gaseous aluminum monochloride is cooled to effect decomposition of the aluminum monochloride into molten elemental aluminum and gaseous aluminum trichloride, the improvement comprising contacting said hot gaseous aluminum monochloride with a cooled, fluidized mass of inert, particle-form material selected from the group consisting of petroleum coke, low ash coal coke, graphite and porous alumina particles, said particle-form material having a density lower than that of the molten elemental aluminum and being substantially non-wetted by said molten aluminum.

References Cited by the Examiner
UNITED STATES PATENTS

| | | | |
|---|---|---|---|
| 1,994,358 | 8/1935 | Holstein | 75—63 |
| 2,328,479 | 8/1943 | Mathieu | 75—67 |
| 2,363,874 | 11/1944 | Krebs. | |
| 2,444,990 | 7/1948 | Hemminger. | |
| 2,509,866 | 5/1950 | Hemminger. | |
| 2,516,974 | 8/1950 | Garrison. | |
| 2,635,949 | 4/1953 | Fenske et al. | 34—57 X |
| 2,670,573 | 3/1954 | Sullivan. | |
| 2,914,398 | 11/1959 | Johnston | 75—68 |
| 3,053,704 | 9/1962 | Munday | 148—20.3 |
| 3,078,159 | 2/1963 | Hollingshead | 75—68 |
| 3,158,467 | 11/1964 | Hollingshead et al. | 75—68 |

DAVID L. RECK, *Primary Examiner.*

H. W. CUMMINGS, H. TARRING,
*Assistant Examiners.*